June 4, 1968    H. VERDIER ETAL    3,386,771
DEVICES FOR MOUNTING VEHICLE WHEELS
Filed April 28, 1966

INVENTOR
HENRI VERDIER
BY

HIS ATTORNEYS 3,386,771
DEVICES FOR MOUNTING VEHICLE WHEELS
Henri Verdier, Beauregard-l'Eveque, Puy-de-Dome,
    France, assignor to Compagnie Generale des
    Etablissements Michelin, Clermont-Ferrand, Puy-
    de-Dome, France
Filed Apr. 28, 1966, Ser. No. 546,089
Claims priority, application France, May 4, 1965,
    15,782
6 Claims. (Cl. 301—9)

ABSTRACT OF THE DISCLOSURE

A detachable mount for vehicle wheels including threaded studs mounted on the hub and passing through corresponding openings in the wheel, the outer ends of the openings of the wheels having concave (conical or spherical) ends receiving a biconvex split washer and a clamping nut having a face engaging the washer complemental to the opposing surface thereon for securing the wheel to the hub.

---

This invention relates to devices for connecting mechanical elements without excessive concentration of stresses on the connecting devices, and more particularly to devices for mounting the wheels of motor vehicles on the hubs or brake drums of the vehicles.

In vehicles having demountable wheels, the most common type of fastening means for the wheels includes a series of threaded members, such as studs or bolts fixed to the brake drums or hubs on the vehicle, these bolts or studs being arranged in a circle concentric with the axis of the drum or hub. A vehicle wheel which will be referred to hereinafter as a wheel disk, although it may be corrugated, dished or the like for reinforcing purposes, is provided with a series of holes for receiving the studs or bolts. In the common type of wheel mount, the nut to be threaded onto each stud or bolt comprises a spherical or conical bearing surface which is applied against the periphery of a countersunk hole pierced in the disc and which centers the wheel accurately. This system has, however, the disadvantage of localizing on the first threads in engagement with the stud, i.e. those nearest to the stud head, the stresses applied to the stud. It is therefore necessary, in order to obtain the indispensable operational safety, either to increase the cross section of the stud or to manufacture it of high-quality steel, without improving the distribution of the stresses or achieving a more rational functioning of the stud by this measure. Moreover, the spherical or conical bearing surface of the nut, which during locking is compressed by the forced penetration into the counter-sunk hole, can tighten on the stud to the extent of bringing about a permanent deformation which is similar to that of a locking which makes unscrewing of the nut difficult, or even impossible, and in any case causes a deterioration of the threads of the stud.

A second type of nut and stud attaching means comprises a nut with a flat bearing surface which is applied against an equally flat surface all around the hole pierced in the wheel disk. The stresses in the stud are then far less localized than in the previous case and the stud operates in far better conditions. However, the centering of the wheel on the hub is not accurate. The cylindrical holes pierced in the disk for the passage of the studs have, of necessity, a diameter which is larger than that of the shank of the studs. Misalignment or eccentric mounting of the wheel results and gives rise to steering troubles and to uneven wear of the tires.

In a modification of the attaching means making use of the flat locating surfaces on a wheel disk, it has been proposed to form a countersunk hole or recess of generally cylindrical shape at the outer end of the openings in the wheel disk and provide a nut which has a cylindrical extension fitting the recess in order to provide proper alignment. However, even with this arrangement, some play must be left to compensate for manufacturing tolerances or errors and as a consequence, misalignment of the wheel is possible.

More particularly, in accordance with the present invention, a wheel disk is provided with holes for receiving threaded members, such as, studs or bolts on the hub or brake drum, these holes being countersunk at their outer ends to provide inclined walls of conical or spherical shape for receiving a washer having a complemental surface and which has its outer side engaged by a nut for clamping the wheel disk firmly to the hub or brake drum. Inasmuch as the washer can seat itself properly in the countersunk portion and can shift relative to the nut, proper alignment of the wheel is assured.

The conical or spherical bearing surface of the washer provided on the side of the disk may have the dimensions which are customary for the known nuts having a spherical or conical bearing surface. The contact surfaces of the nut and of the washer are, for preference, either spherical—in which case their radius of curvature lies between 5 and 20 times the internal radius of the washer—or conical with a center angle between 150° and 180° and, more particularly, between 160° and 175°.

The spherical and/or conical bearing surfaces of the washer serve to ensure an accurate centering of the wheel on the hub when, upon the tightening of the nut, the washer is compressed between the wall of the countersunk hole and the concave surface of the nut. The convexity of the surface of the washer in contact with the nut has the further effect of ensuring a distribution of the stresses over the length of the threads of the stud which are in engagement with the nut; actually, the tightening tends to spread the base of the nut, thus relieving the first threads of the nut, i.e. those nearest to the washer, from overstresses.

According to one particularly advantageous form of the nut, the washer is provided with a slot, which is for example radial and the edges of which are, for preference, adequately spaced so as not to touch each other when, by tightening of the nut, the washer is compressed against the shank of the stud and against the wall of the countersunk hole.

In this preferred arrangement of the invention, the screwing-up of the nut serves to reduce progressively and then to eliminate the clearance between the washer and the shank of the stud, which represents an additional means for ensuring the centering of the wheel and of reliable joining of the stud and the disk and, accordingly, the hub and the disk. In this arrangement, it is even possible for the contact surfaces of the washer and the nut to be flat, but this is not preferable as the distribution of the stresses over the length of the threads of the nut and stud is improved by a slight conicity or sphericity of these surfaces, provided that their convexity is directed away from the wheel disk. Naturally, the threading of the stud must not extend as far as into that part of the shank which is enclosed by the washer, this part, on the contrary, having to be perfectly smooth, for obvious reasons.

Although the split washer may be independent from the nut, it is advisable to assemble the nut and the washer by means of a permanent connection which, while leaving them free to rotate relatively to one another, prevents their separation and possible loss or wrong assembly of the washer. Moreover, the washers may be split to enable them to contact against the shanks of the bolts or studs as they are forced into the recesses in the wheel disk to further assure a positive alignment of the wheel with the hub or brake drum.

For a better understanding of the present invention, reference may be had to the accompanying drawings, in which FIGURE 1 is a view in longitudinal section of a typical fastening device embodying the present invention with portions of a wheel and hub shown partially broken away;

Figure 1:
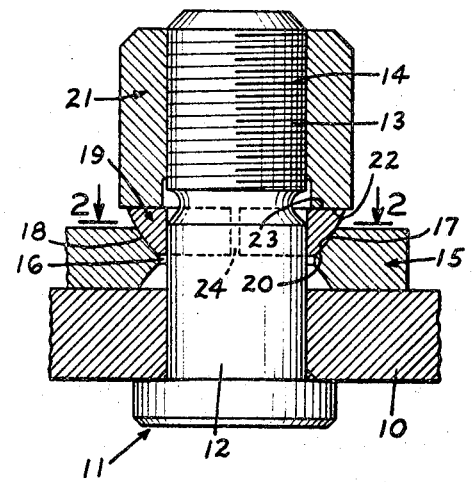
Figure 2:
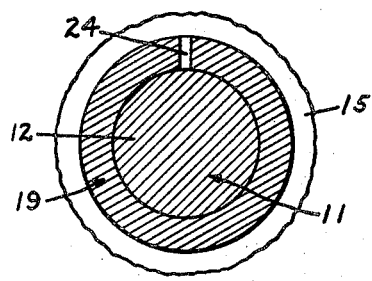
FIGURE 2 is a view in cross section taken on line 2—2 of FIGURE 1.

In FIGURE 1 of the drawings, a portion of a vehicle wheel hub or brake drum 10, referred to hereinafter as a hub, is provided with a series of bolts 11 which are fixed thereto as by welding or the like. The inner portion of the shank 12 of each bolt is unthreaded, but the outer end portion 13 of the bolt is provided with threads 14. A portion of a wheel disk 15 is shown as mounted on the bolt 11. As is usual, the wheel disk is provided with a plurality of openings 16 for receiving the bolts carried by the hub 10. Each hole 16, as illustrated, is of somewhat larger diameter than the shank 12 of the bolt and in accordance with the present invention is provided with a countersunk recess 17 provided with an inclined circumferential wall 18 which, as shown in FIGURE 1, is of spherical curvature but can be conical, if desired. Received in the countersunk recess 17 is a washer 19 of somewhat greater thickness than the depth of the recess 17 and which has an outer spherically curved wall 20 complemental to the wall 18. A nut 21 is threaded on the threaded portion 13 of the bolt and has an inner flat end 22 which engages the flat outer surface 23 of the washer. Also, as shown in FIGURE 2, the washer 19 is provided with a slot 24 through one side thereof to enable it to contract around the shank 12 of the bolt 11. Accordingly, when the nut 21 is tightened on the bolt 11, the washer 19 enters in the recess, is compressed around the shank of the bolt and the series of bolts, washers and nuts thereby retain the wheel disk in accurate alignment with the axis of the hub.

Figure 3:
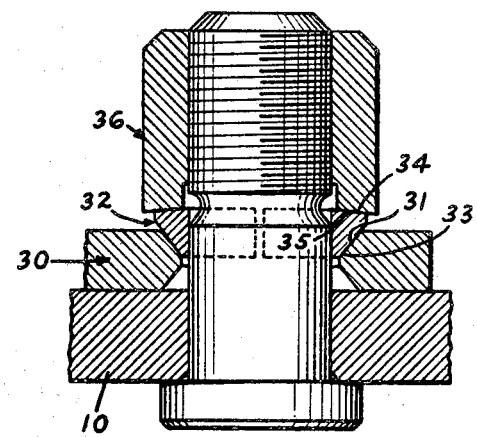
FIGURE 3 is a view in longitudinal section and partially broken away of a modified bolt and nut for connecting a wheel disk to a hub.

While the washer 19 and the recess 17 are disclosed as having spherical walls, the wall may be generally conical and the upper surface of the washer and the under surface of the nut modified to enable more accurate contact between the engaging surfaces. Referring to FIGURE 3, the wheel disk 30 has a countersunk recess 31 with a conical wall and the washer 32 also has a complemental conical wall 33. Also, the upper surface 34 of the washer and the under surface 35 of the nut 36 are complementally conical. The inclination of the surfaces 34 and 35 is between 150° and 175° and the preferred inclination is between 165° and 175°. In the example in FIGURE 3 the inclination is 170°. In this way, suitable adjustment will take place between the nut, the washer and the wheel disk as the nut is tightened.

In the modification shown in FGURE 4, the outer inclined wall 40 of the washer 41 is curved spherically as is the upper surface 42 of the washer. Also, the washer engaging surface 43 of the nut 44 is curved on a radius which is between five and twenty times the inner radius of the washer to enable proper alignment of the washer with the stud or bolt and the nut.

Figure 4:
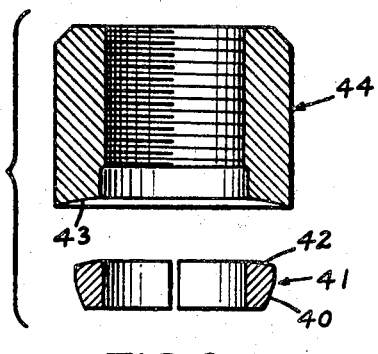
FIGURE 4 is a sectional and exploded view of the nut and washer of a modified form of the fastening device.
Figure 5:
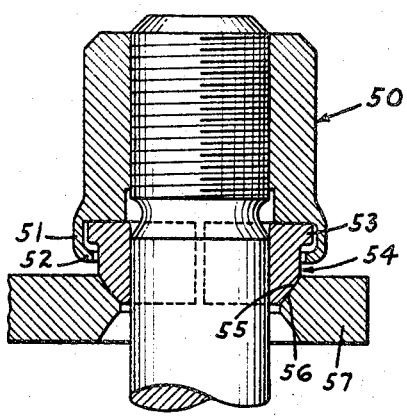
FIGURE 5 is a view in vertical section and partially broken away of a modified form of fastening device embodying the invention.

The nut and washer are shown as separate elements in FIGURES 1 and 4, but they may be interconnected to prevent their separation, possible loss or wrong assembly of the washer. As shown in FIGURE 5, the nut 50 has a downwardly extending marginal collar 51 with an inwardly bent rim 52 which engages below a flange 53 on the upper end of the washer 54. The collar 51 and rim 52 receive the washer 54 loosely so that relative rotation and lateral and endwise movement between the nut 50 and the washer 54 can occur. The engaging surfaces 55 and 56 on the washer and the recess in the wheel disk 57 may be either conical or spherical.

Figure 6:
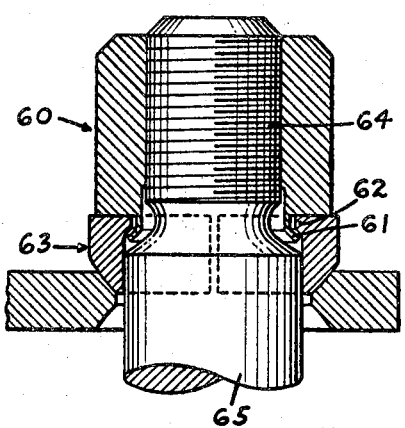
FIGURE 6 is a view in longitudinal section and partially broken away of still another modification of the fastening device embodying the present invention.

In the nut and washer unit disclosed in FIGURE 6, the nut 60 includes an internal collar 61 which receives loosely an internal flange 62 on the washer 63. To accommodate the flange 62, the threaded section 64 of the bolt is of smaller external diameter than the smooth shank portion 65 of the bolt with which the washer engages when the wheel disk is mounted on the hub, not shown.

I claim:

1. A mount for a detachable vehicle wheel, comprising the combination of a hub, a plurality of threaded members on said hub, each threaded member being formed with a smooth shank portion, said wheel including a wheel disk having a plurality of openings for receiving said threaded members loosely, each of said openings having a countersunk peripheral portion with a wall inclined inwardly toward said opening on the opposite side of said disk from said hub, a washer on each threaded member having a surface substantially complemental to said inclined wall, and a nut on each threaded member engaging said washer for forcing said washer into said countersunk portion to center said threaded member in said opening and attach said disk to said hub, said washer and said nut having complementally shaped engaging surfaces inclined oppositely to said inclined wall, whereby said nut when tightened tends to be spread at the portion thereof nearest said washer, thereby relieving the threads of said nut nearest said washer from overstress.

2. The mount set forth in claim 1 comprising means connecting said washer to said nut with capacity for relative rotary, endwise and lateral movement.

3. The mount set forth in claim 1 in which said inclined wall is spherically curved.

4. The mount set forth in claim 3 in which said nut and washer have substantially spherical curved engaging surfaces with a radius between about five and twenty times as long as the inner radius of said washer.

5. The mount set forth in claim 3 in which said washer has a slot through one side thereof.

6. The mount set forth in claim 1 in which the threading of said threaded member terminates short of the portion of said member enclosed by said washer.

References Cited

UNITED STATES PATENTS

| 1,077,051 | 10/1913 | Dodds | 85—1.5 |
| 1,940,675 | 12/1933 | Crowther | 301—9 |
| 2,336,767 | 12/1943 | Ash | 301—9 |
| 2,597,835 | 5/1952 | Eksergian | 301—9 |
| 2,844,409 | 7/1958 | Eksergian | 301—36 |

RICHARD J. JOHNSON, *Primary Examiner.*